United States Patent [19]

Marshall

[11] Patent Number: 4,480,496
[45] Date of Patent: Nov. 6, 1984

[54] IDLE SPEED INCREASING APPARATUS

[76] Inventor: Sydney D. Marshall, 3714 Cummings Hwy., Chattanooga, Tenn. 37419

[21] Appl. No.: 443,201

[22] Filed: Nov. 22, 1982

[51] Int. Cl.³ .............................................. G05G 1/14
[52] U.S. Cl. ........................................ 74/513; 74/532; 74/563; 180/335
[58] Field of Search ................ 74/532, 513, 562, 563, 74/566; 180/335; 70/202; 411/400

[56] References Cited

U.S. PATENT DOCUMENTS

| | | | |
|---|---|---|---|
| 476,227 | 5/1892 | Dunning | 411/400 |
| 518,825 | 4/1894 | Pelton | 411/400 |
| 1,546,192 | 7/1925 | Berg | 292/256.75 |
| 1,553,280 | 9/1925 | Wright | 74/526 |
| 1,566,315 | 12/1925 | Daumueller | 74/563 |
| 1,576,396 | 3/1966 | Wood | 74/526 |
| 1,584,659 | 5/1926 | Schacht | 74/563 |
| 2,553,448 | 5/1951 | Fraven | 74/532 X |
| 2,638,016 | 5/1953 | Munson | 74/513 |
| 2,861,468 | 11/1958 | Dow | 74/532 |
| 2,924,118 | 2/1960 | Christner | 74/532 |
| 3,014,683 | 12/1961 | Littman | 411/400 |
| 3,225,623 | 12/1965 | Hyman | 74/532 |
| 3,316,777 | 5/1967 | Sain | 74/532 |

Primary Examiner—Alexander Grosz
Assistant Examiner—Anthony W. Roskob
Attorney, Agent, or Firm—Alan Ruderman

[57] ABSTRACT

A jacket securable to the accelerator foot pedal of a truck cab has a slotted plate on the top thereof. A threaded rod having one end pivotably carried by the fire wall of the cab is receivable within the slot. A nut is threadedly received on the free end of the rod and an abutment member is carried by the rod intermediate the nut and the pivoted end. When the rod is positioned within the slot the abutment member may be disposed against the face of the plate remote from the fire wall, and when so disposed rotation of the nut will control depression of the pedal and thus the idle speed of the engine of the truck so that the idle speed may be increased when the truck is stationary in extreme temperature environments.

14 Claims, 4 Drawing Figures

IDLE SPEED INCREASING APPARATUS

BACKGROUND OF THE INVENTION

This invention relates to an idle speed increasing apparatus for motor driven vehicles and more particularly to apparatus for increasing the idle speed of the engine of large trailer trucks when the engine must continue to run while the vehicle is stationary.

When the large multi-wheel trucks used for carrying heavy loads over long distances stop, the engine is generally kept running at idle speed, especially in hot and cold climates. The cab of such vehicles have a sleeping area so the driver, or drivers in the case of two driver trucks, can sleep in the cab when they tire while driving in a sparsely populated location, and for economical reasons, when in a location where motel rates are high. The vehicle also must stop on numerous occasions during long trips for the drivers to eat. In cold environments, when the drivers stop, the engine remains running to maintain heat within the cab, especially when they are trying to sleep, and to prevent gelling of the diesel fuel. If the engine should be shut for a short time in extremely cold weather, the diesel fuel tends to gel, thereby fouling the engine and requiring correction by a skilled mechanic. Under hot weather conditions, the engine is permitted to continue to run for driving the air conditioning unit.

One problem encountered with diesel engine driven trucks is that the idle speed is exceptionally low. Thus, even when the engine idles during such stops, the coolant temperature is such that sufficient heat in cold environments is not obtained, and the drivers find it difficult to sleep in the cab, and at exceptionally low temperatures, the fuel still tends to gel. In high temperature environments, the low idle speed results in insufficient air being drawn through the air conditioning unit so that the drivers can't sleep within the cab and are forced to stop at a motel. The low idle speed also results in the turbocharger operating at too low a speed resulting in the failure to burn all the oil out of the diesel fuel. The oil build-up weakens the oil seals causing leakage and eventual failure.

The above problems do not occur when the truck is moving and the engine is operating under normal conditions at higher engine speeds. The problem only occurs when the truck is stationary and the engine is idling or shut. For this reason some manufacturers include a throttle within the cab for increasing the engine idle speed; but other manufacturers do not provide such a speed control. The known throttle devices used in truck cabs include a cable extending through a conduit. These however, have not been dependable since corrosion of the cable or conduit have resulted in binding between the cable and conduit, conduit clogs and cable failure. More recently a simple adjustable pogo-stick pole has been tried by truck drivers for depressing the accelerator pedal, but it has been ineffective since vibration caused by the engine results in disengagement of the device from the pedal.

SUMMARY OF THE INVENTION

Consequently, it is a primary object of the present invention to provide an inexpensive simple apparatus for increasing the idle speed of the engine of a stationary vehicle from within the driver compartment.

It is another object of the present invention to provide apparatus that can be attached to the accelerator pedal of a diesel driven truck for increasing the idle speed of the engine.

It is a further object of the present invention to provide apparatus that can be readily installed within the cab of a diesel driven truck for increasing the idle speed of the engine to maintain a comfortable environment within the cab when the truck is stationary, said apparatus including means for drawing the accelerator pedal toward the speed increasing position.

Accordingly, the present invention provides a jacket securable to the accelerator foot pedal of a truck cab, the jacket having coupling means for removably connecting adjustable means to the pedal, the adjustable means also being connectable to a wall of the cab. When connected to the pedal the adjustable means permits the accelerator pedal to be depressed toward the speed increasing position. The jacket coupling means preferably comprises an upstanding slotted bridge member, the adjustable means being positionable within the slot and includes an abutment member for depressing the accelerator foot pedal downwardly toward the floor to increase the idle speed of the engine. The jacket may be secured to the underside and upper end of the accelerator pedal, but preferably comprises a sleeve positionable about the accelerator pedal to encase the pedal therein, the bridge member being attached to the upper end of the sleeve. The adjustable means preferably comprises a threaded rod positionable within the slot in the bridge member, and a locking member, the locking member being threadedly adjustable on one end of the rod for acting on the abutment member. The other end of the rod has means connectable to the fire wall of the cab, and such means preferably includes pivotable means whereby the rod may be pivotably disposed out of the path of the foot pedal under nomal operation of the truck when disengaged from the sleeve. The construction of the apparatus is such that it may be installed within cabs of at least one manufacurer with only a screw driver and a pair of pliers, and readily installable within cabs of other manufacturers. Thus, the driver of the truck may himself install the apparatus without necessitating the services of a skilled mechanic.

BRIEF DESCRIPTION OF THE DRAWINGS

The particular features and advantages of the invention as well as other objects will become apparent from the following description taken in connection with the accompanying drawings, in which.

DESCRIPTION OF THE PREFERRED EMBODIMENTS

Figure 1:
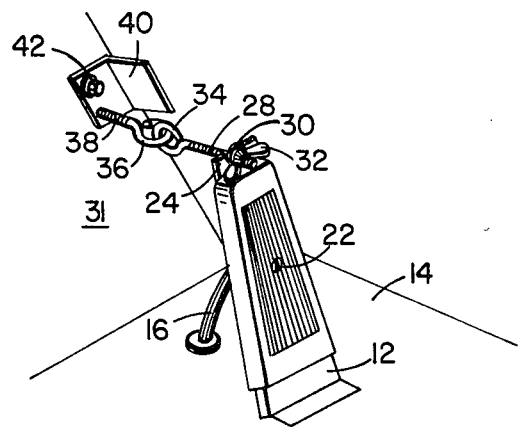
FIG. 1 is a perspective view of the preferred form of the idle speed increasing apparatus constructed in accordance with the present invention and illustrated in the speed controlling disposition, and depicting a portion of the truck cab.
Figure 2:
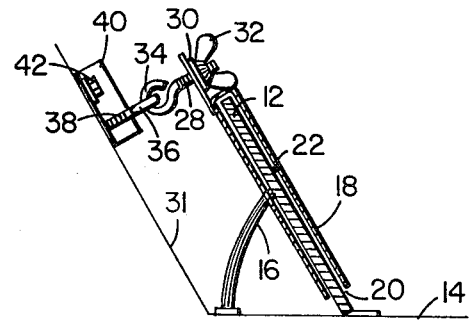
FIG. 2 is a vertical sectional view taken through the jacket and accelerator pedal illustrated in FIG. 1.
Figure 3:
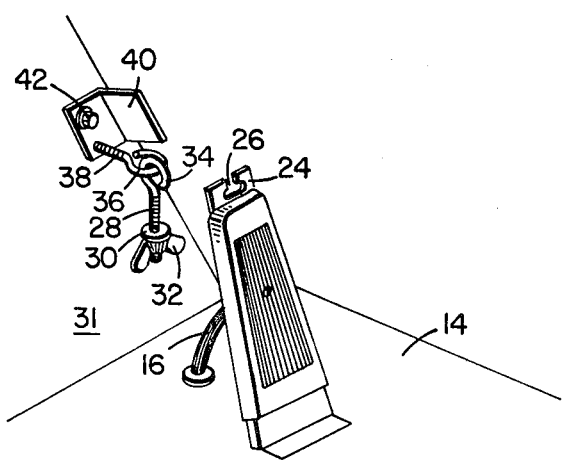
FIG. 3 is a view similar to FIG. 1, but with the apparatus in the normal operating position of the truck disconnected from the jacket.

Referring to FIGS. 1 through 3 of the drawings, a portion of the interior of a truck cab is illustrated, that portion being the surfaces adjacent to the conventional accelerator pedal 12 pivotably mounted on the floor 14.

Extending upwardly from the floor 14 of the cab is the accelerator pedal lever 16 which, although not illustrated, conventionally is connected to linkage for controlling the speed of the engine. In accordance with the principles of the present invention a jacket in the form of a hollow sleeve 18 having an open end 20 is positioned about at least a substantial portion of the pedal 12, the pedal being received through the opening 20 and enclosed within the hollow of the sleeve. Thus, the shape of the sleeve is substantially the same as that of the pedal 12 and has the interior hollow of a size slightly larger than the pedal. The sleeve is positioned about the pedal and may be secured by a set screw 22 countersunk into the foot engaging surface of the sleeve so as not to interfere with the normal "feel" of the pedal, the set screw being tightened against the corresponding face of the pedal. The sleeve may be formed from sheet material stamped and bent into the desired shape or molded from plastic. Fixed to or securely fastened to the top of the sleeve 18 is an upstanding connecting bracket member in the form of a plate-like bridge member 24 having a substantially centrally disposed slot 26 opening outwardly at the end remote from the sleeve. As illustrated, the slot 26 extends substantially normal to the plane of the pedal 12, and may be wider at the closed end than the open end for reasons which will become apparent.

Under normal driving conditions the engine operates at a speed high enough to provide sufficient heat to the cab in cold climates and air conditioning in hot climates. However, as noted above, when the truck is parked while in an environment having extreme temperature conditions, the normal idle engine rotary speed of a diesel driven truck is too low to provide comfortable environmental control within the cab for sleeping or preventing gelling of the fuel at very low temperatures. Thus, under normal conditions nothing is attached to the connecting bracket member 24. However, when the truck is stationary and the engine is idling, an adjustment means is connected to the bracket 24 to pivotably draw the sleeve 18 and thus the pedal 12 downwardly toward the floor 14 against the lever 16 to increase the speed of the engine. The adjustment means preferably takes the form of a threaded rod 28 having a bearing plate member 30 positioned thereon together with a nut 32 threadedly received on the rod. Preferably the nut 32 may be a wing-nut and the bearing member may be a washer, or similar members, which may be integrated together into a single element. The diameter of the bearing member 30, or a similar dimension of a non-circular bearing member, is wider than that of the slot 26 so the member 30 will not slip through the slot and so that the rod 28 may be positioned within the slot with the bearing member acting as an abutment means against the bridge member 24. Since the preferred form of the slot 24 is open at the upper end of the rod 28 may merely be positioned within the slot, when desired, without removing the member 30 and the nut 32. However, the shape of the slot is not critical since a closed slot may be utilized, although the bearing member and nut would have to first be removed from the rod and thereafter reconnected.

The other end of the rod 28 of the adjusting means is supported by the fire wall 31 of the cab behind the location of the pedal. To this end, so that the rod does not interfere with the operation of the pedal when control of the idle speed is not required, i.e., when the truck is under normal operating conditions, the rod is pivotably mounted so that it may be disposed against or adjacent the fire wall. Although a more elaborate construction may be utilized, such as for example lever members, in keeping with the object of simplicity and ease of installation, the end of the rod remote from the nut 32 may be bent into the shape of a hook or eyelet 34 which may be loosely interlocked or concatenated through an aperture in a plate secured to the fire wall. However, as illustrated, it is preferred to loosely concatenate the eyelet in chainlink-like fashion about a similar eyelet 36 of a threaded securing rod 38 so that the eyelet 34 and thus the rod 28 may pivot about the eyelet 36 from the operative to the inoperative position. The rod 38 may then be threadedly received within the fire wall. In the cab of at least one manufacturer, there is a bracket 40 secured to the fire wall adjacent the side wall. The bracket is held in place by two bolts 42, only one of which is illustrated, and the rod 38 may be threaded into the hole vacated by one of the bolts as illustrated.

Consequently, when the truck is mobile the disposition of the rod 28 is as illustrated in FIG. 3, but when the truck is stationary and the engine is to be kept running during extreme temperature conditions, the rod 28 is pivotably moved to the disposition illustrated in FIGS. 1 and 2. When so disposed the rod 28 is received within the slot 26 with the bearing plate and adjusting nut 32 disposed on the side of the bridge 24 opposite to the fire wall. With the parts in this position adjustment of the idle speed may be made merely by threading the nut 32 further onto the rod 28 to depress the accelerator pedal 12 until the idle speed of the engine has been set at the desired speed.

Figure 4:
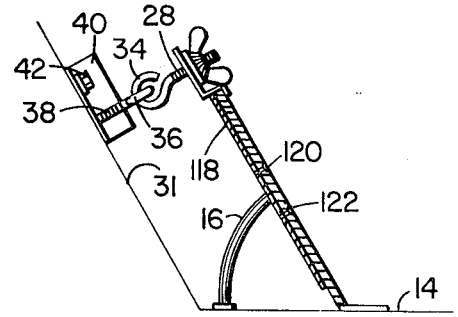
FIG. 4 is a view similar to FIG. 2, but of a modified form of the invention.

In the embodiment of FIG. 4, rather than a hollow sleeve 18, the jacket may merely be a plate 118 fastened to the rear of the pedal 12 by means of a couple of fastening screws 120, 122 or the like secured into the pedal. The remainder of this construction may be the same as that illustrated in the embodiment of FIGS. 1 through 3.

Numerous alterations of the structure herein disclosed will suggest themselves to those skilled in the art. However, it is to be understood that the present disclosure relates to the preferred embodiment of the invention which is for purposes of illustration only and not to be construed as a limitation of the invention. All such modifications which do not depart from the spirit of the invention are intended to be included within the scope of the appended claims.

Having thus set forth the nature of the invention what is claimed herein is:

1. Apparatus for increasing the idle speed of a truck engine so that the engine may drive auxiliary equipment at sufficient speed while the truck is stationary, said truck having a driver compartment including a substantially planar accelerator pedal pivotably mounted about a pivot means on the floor of the driver compartment and extending upwardly from the pivot means for controlling the engine to operate at various speeds, the engine speed being increased when said pedal is pivotably depressed, said apparatus comprising, a jacket comprising a hollow sleeve received about at least an upper portion of said pedal, means for fastening said jacket to said pedal when the jacket is positioned thereon, coupling means fixed to said jacket remote from the pivot means when said jacket is positioned on said pedal, said coupling means comprising a plate including means defining a slot extending substantially normal to the plane of said pedal, an adjustment rod, means for pivotably carrying a first end of said rod from a wall of said driver compartment proximate said pedal at a disposition such that when operative said rod may be received within said slot with a second end of the rod extending through said slot, and when inoperative may be pivoted away from said pedal, abutment means disposed about said rod, said abutment means being larger than the smallest dimension of said slot, and adjustable fastening means securable on said rod more closely proximate said second end than said abutment means, whereby said abutment means may be disposed in abutting relationship intermediate said plate and said fastening means when said rod is in the operative position within said slot to pivotably depress said pedal as said fastening means is adjusted along said rod toward said first end.

2. Apparatus as recited in claim 1, wherein said rod is threaded and said adjustable fastening means comprises a nut threadedly received on said rod.

3. Apparatus as recited in claim 2, wherein said abutment means is fixed to said nut.

4. Apparatus as recited in claim 1, wherein said rod is threaded and said adjustable fastening means comprises a nut thrededly received on said rod.

5. Apparatus as recited in claim 4, wherein said abutment means is fixed to said nut.

6. Apparatus as recited in claim 1, wherein said sleeve is closed at an upper portion thereof.

7. Apparatus as recited in claim 6, wherein said plate is secured to said upper portion.

8. Apparatus as recited in claim 7, wherein said slot opens at the upper end of said plate.

9. Apparatus as recited in claim 1, wherein said means for pivotably carrying said rod from a wall of said compartment comprises an eyelet at said first end, connecting means secured to said wall, said connecting means including means defining an aperture, said eyelet being loosely concatenated through said aperture.

10. Apparatus as recited in claim 9, wherein said connecting means comprises a second rod and said aperture comprises a second eyelet.

11. Apparatus as recited in claim 10, wherein said rod is threaded and said adjustable fastening means comprises a nut threaddely received on said rod.

12. Apparatus as recited in claim 11, wherein said abutment means is fixed to said nut.

13. Apparatus as recited in claim 1, wherein said plate is secured to an upper portion of said sleeve.

14. Apparatus as recited in claim 13, wherein said slot opens at the upper end of said plate.

* * * * *